(12) United States Patent
McComber

(10) Patent No.: US 7,814,430 B2
(45) Date of Patent: Oct. 12, 2010

(54) ULDESIGN: WYSIWYG FINISHING

(75) Inventor: Brandon S. McComber, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 283 days.

(21) Appl. No.: 11/314,669

(22) Filed: Dec. 21, 2005

(65) Prior Publication Data

US 2007/0143696 A1    Jun. 21, 2007

(51) Int. Cl.
*G06F 3/048* (2006.01)

(52) U.S. Cl. .................. 715/771; 715/274; 715/711; 715/764; 715/810; 715/812; 715/821; 715/822; 715/823; 715/824; 715/839; 715/856; 715/860; 715/861; 715/862; 399/81; 399/407; 399/408; 399/409; 399/410; 358/1.1

(58) Field of Classification Search .................. 715/771, 715/711, 764, 781, 810, 812, 821–824, 839, 715/856, 859–862, 274; 399/81, 397, 407–410; 358/1.1
See application file for complete search history.

(56) References Cited

U.S. PATENT DOCUMENTS

| | | | | |
|---|---|---|---|---|
| 5,185,628 | A * | 2/1993 | Wilson et al. .................. 399/81 |
| 5,444,550 | A * | 8/1995 | Enokida et al. ............. 358/453 |
| 5,694,610 | A * | 12/1997 | Habib et al. ................. 715/210 |
| 6,091,929 | A | 7/2000 | Yamazaki et al. |
| 6,115,110 | A | 9/2000 | Koga |
| 6,134,019 | A | 10/2000 | Wantuck, Jr. et al. |
| 6,134,568 | A * | 10/2000 | Tonkin ........................ 715/209 |
| 6,185,591 | B1 * | 2/2001 | Baker et al. .................. 715/210 |
| 6,441,919 | B1 * | 8/2002 | Parker et al. ................ 358/1.18 |
| 6,453,132 | B2 * | 9/2002 | Ishikura ........................ 399/81 |
| 6,473,539 | B1 | 10/2002 | Koga |
| 6,621,590 | B1 * | 9/2003 | Livingston .................. 358/1.15 |
| 6,661,530 | B1 * | 12/2003 | Munetomo et al. .......... 358/1.15 |
| 6,704,527 | B2 * | 3/2004 | Asai ............................. 399/82 |
| 6,839,149 | B2 * | 1/2005 | Herr ........................... 358/1.15 |
| 7,057,749 | B2 * | 6/2006 | Ozaki ......................... 358/1.13 |
| 7,301,662 | B2 * | 11/2007 | Mifune ....................... 358/1.15 |
| 7,424,236 | B2 * | 9/2008 | Inoue et al. .................... 399/81 |
| 2001/0044868 | A1 * | 11/2001 | Roztocil et al. ............. 710/129 |
| 2002/0085223 | A1 * | 7/2002 | Bigi ........................... 358/1.13 |
| 2003/0043211 | A1 * | 3/2003 | Kremer et al. .............. 345/838 |
| 2003/0043212 | A1 * | 3/2003 | Kremer ....................... 345/838 |
| 2005/0162689 | A1 * | 7/2005 | Roztocil ...................... 358/1.15 |
| 2005/0200879 | A1 * | 9/2005 | Nakagiri et al. ............. 358/1.13 |
| 2007/0024872 | A1 * | 2/2007 | Salgado ....................... 358/1.1 |

* cited by examiner

*Primary Examiner*—Kieu Vu
*Assistant Examiner*—Patrick F Riegler
(74) *Attorney, Agent, or Firm*—Fay Sharpe LLP

(57) ABSTRACT

A method and system for applying user-specified finishing options to a printed output document. A finishing window is displayed showing a document mimic in the finishing window, and displaying finishing tool selection regions in the finishing window which enable the user to activate selective finishing tools. Finishing location identifiers are displayed on portions of the document mimic, each displayed location identifier being associated with the currently activated finishing tool, and each displayed location identifier identifying a region of the printed output document by its location on the document mimic. WYSIWYG representations of user-selected finishing tool operations are performed in the portion of the document mimic identified by the selected finishing location identifier. The WYSIWYG operations include, but are not limited to, stapling, hole-punching, V-folding, C-folding, Z-folding, and binding. Also included are WYSIWYG operations for undoing each of the aforementioned operations.

12 Claims, 6 Drawing Sheets

ULDESIGN: WYSIWYG FINISHING

BACKGROUND

Many current reprographic and printing systems currently include finishing options such as, for example, stapling, hole punching and folding options such as V-folding, C-folding and Z-folding. Manufacturers of such systems typically provide a user interface including a means for selecting desired finishing options. Finishing parameters are normally presented via a combination of icon and/or text labels describing each provided finishing option so that the user may select particular finishing options. For example, by selecting "One staple, portrait left", the user indicates that a staple is to be placed in the top left corner of a portrait oriented output document. Of course, each finishing option that the particular system is capable of producing is normally displayed on the user interface, either in a summary window or on separate windows.

There are at least three significant problems with current methods of selecting finishing parameter options. For one, the finishing option programming method is indirect. That is, the user is required to make selections by way of textual or GUI components such as, e.g., radio option buttons or combo box selections. For another, since all parameters a system is capable of acting upon should be presented in some manner, the user must comprehend what each icon and/or text label means in an oftentimes large list of optional parameters. Then the user needs to correlate that understanding with a mental picture of how the final output document should appear. When the user finds the desired correlation, the user then selects and applies the respective parameter. Unfortunately, the user necessarily parses through many finishing options and therefore makes many comparisons and decisions in order to achieve the one desired outcome.

Yet another problem arises due to the fact that a finishing module has physical limits with respect to capabilities and how it can apply a particular finishing parameter. Therefore, conflict error checking is required to disallow the user from programming a combination of parameters that is not possible for the particular finishing system. Typically, the special behaviors and conflicts of the finishing system are confusing and awkward to the user, and difficult to understand. For these reasons, an improved method of communicating finishing options to a user for selection by the user of a reprographic or printing system is desirable.

BRIEF DESCRIPTION

A method of programming finishing options in a printing system is provided for a system having a user interface with a graphical display screen, and having a finishing subsystem for applying user-specified finishing options to a finished output document. The method includes displaying a finishing window on the user interface display screen, displaying a document mimic in the finishing window, and displaying finishing tool selection regions in the finishing window for enabling the user to activate a particular finishing tool. Finishing location identifiers are displayed overlaid on portions of the document mimic, each displayed location identifier being associated with the currently activated finishing tool, and each displayed location identifier identifying a region of the output document by its location on the document mimic. In accordance with user selection of a displayed finishing location identifier, a graphical representation of operation of the activated finishing tool is performed in the portion of the document mimic identified by the selected finishing location identifier. The user selections are stored, and the finishing tool feature associated with the stored selections is activated when producing the finished document.

Another method is provided in a reprographic system for applying user-specified finishing options to a printed output document. The method includes displaying a finishing window on a user interface display screen, displaying a document mimic in the finishing window, and displaying finishing tool selection regions in the finishing window for enabling the user to activate one of the finishing tools. Displaying finishing tool selection regions may include displaying a button for each of the finishing tools, displaying a text box for each of the finishing tools, and displaying an iconic representation of each of the finishing tools. Finishing location identifiers are displayed on portions of the document mimic, each displayed location identifier being associated with the currently activated finishing tool, and each displayed location identifier identifying a region of the printed output document by its location on the document mimic. WYSIWYG representations of user-selected finishing tool operations are performed in the portion of the document mimic identified by the selected finishing location identifier. The WYSIWYG operations include, but are not limited to, stapling, hole-punching, V-folding, C-folding, Z-folding, and binding. Also included are WYSIWYG operations for undoing each of the aforementioned operations. The user-selected operations are stored and ultimately performed by the respective finishing tool feature when the printed output document is produced.

A printing system is provided including a user interface, a graphical display screen, a user input/output device, and a pointing device. A processor is included for receiving and processing digital documents from a scanning system or a network, receiving user instructions from the user interface, and displaying instructions and graphical images on the display screen. A storage system is connected to the processor, and a finishing system is included for receiving digital documents and finishing options from the processor and for producing finished documents. The processor is configured to display a finishing window on the user interface display screen, display a document mimic in the finishing window, and display finishing tool selection regions in the finishing window for enabling the user to activate selected finishing tools. The finishing tool selection regions may be displayed as buttons corresponding to respective finishing tools, text boxes, and iconic representation of respective finishing tools. Finishing location identifiers are overlaid on portions of the document mimic, each displayed location identifier being associated with the currently activated finishing tool, and each displayed location identifier identifying a region of the printed output document by its location on the document mimic. WYSIWYG representation of operations of user-selected, activated finishing tools are displayed in the portion of the document mimic identified by the selected finishing location identifier, including, but not limited to, stapling, hole-punching, V-folding, C-folding, Z-folding, and binding. WYSIWYG representations are also provided for undoing each of the aforementioned operations. Finishing location identifiers are removed from the finishing window if operation of the activated finishing tool at the respective location conflicts with operation of the finishing tool associated with a previously selected finishing location identifier. The status of each finishing option is stored based on the performed representations of an operation and the performed representations of undoing an operation, and the stored digital document and each stored status is sent to the finishing system, wherein the finishing system is configured to perform each finishing tool feature based on the finishing option status received from the processor.

DETAILED DESCRIPTION

Figure 1:
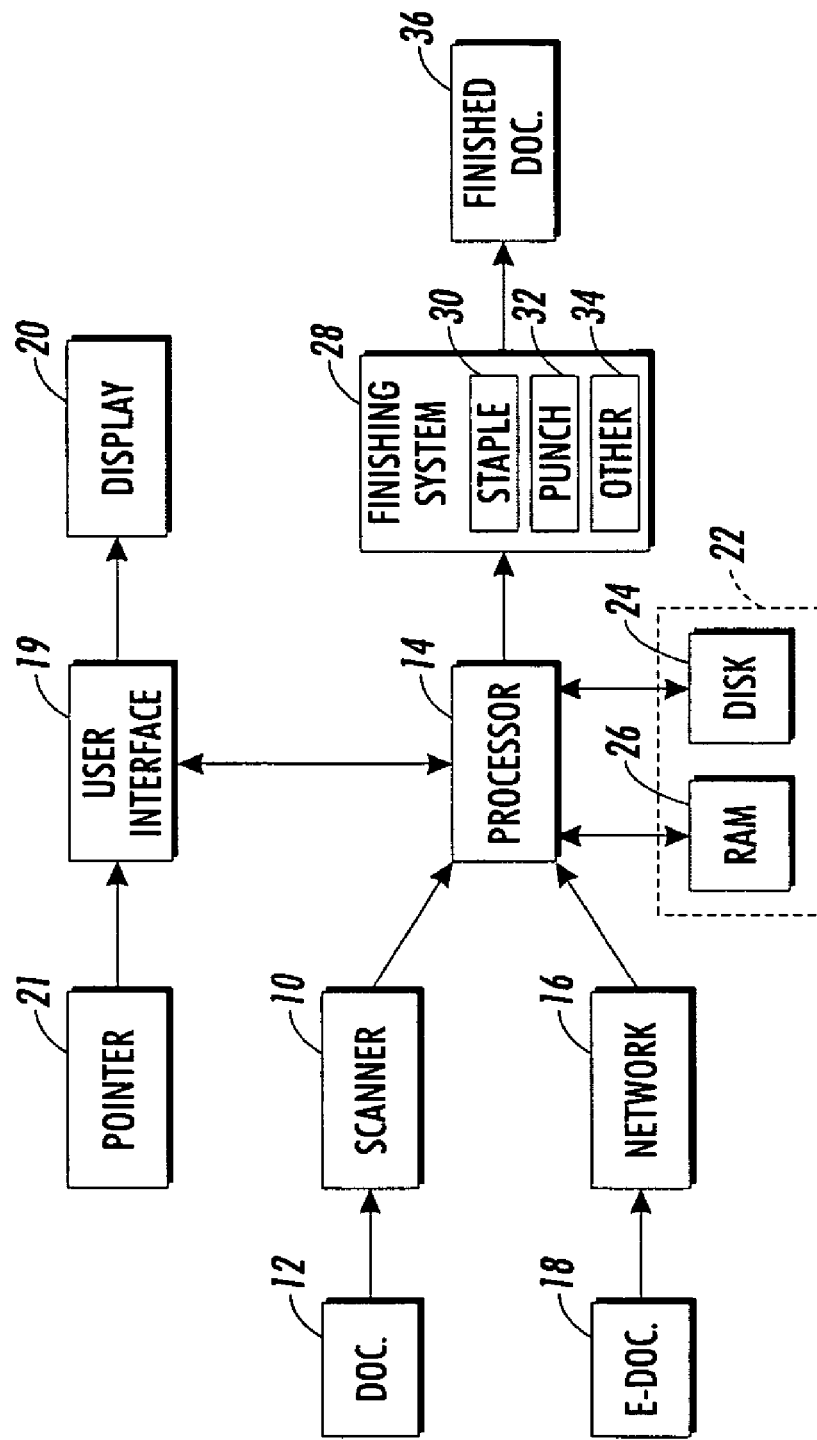
FIG. 1 is a block diagram of an embodiment suitable for performing concepts of the present application.

With reference to FIG. 1, portions of a printing system or reprographic system suitable for incorporating concepts of the present application are shown. Only portions of the reprographic system that facilitate an understanding of the present application are shown. It is to be understood that although the present application is described in terms of a reprographic system, the concepts described herein are equally suitable for printing systems and other systems having a finishing system. As shown, the exemplary system includes a scanner 10 which may be any of a variety of scanners known in the art such as, e.g., a flathead scanner. The scanner 10 scans input documents 12 to produce digital documents which are then input to a processor 14. The processor 14 also includes a network connection 16 for receiving electronic documents 18 over the network.

A user interface 19 is provided for interacting with a user of the system, i.e., receiving commands from the user, such as finishing options, and displaying job status and system status information to the user on a display screen 20. In some embodiments, a pointing device 21, such as, e.g. a mouse or a touchpad, is provided. Also included in the reprographic system is a main storage system 22 including, e.g., one or more disk storage units 24 and random access memory (RAM) 26. The disk storage units include, but are not limited to, hard drives, optical drives such as, e.g., CD and DVD drives, and floppy drives. The disk storage units may be either locally or remotely connected. The processor 14 provides digital documents and user-programmed finishing system options to a finishing system 28 for final processing. The finishing system includes several subsystems including, but not limited to, a stapling subsystem 30, a hole-punch subsystem 32, and other finishing system subsystems 34 such as, e.g., a saddle-stitching subsystem and a folding subsystem for providing V-folding, C-folding, and Z-folding capabilities to the finishing system 28. The finishing system 28 produces finished documents 36 which are finished in accordance with the user-programmed finishing parameters.

Figure 2:
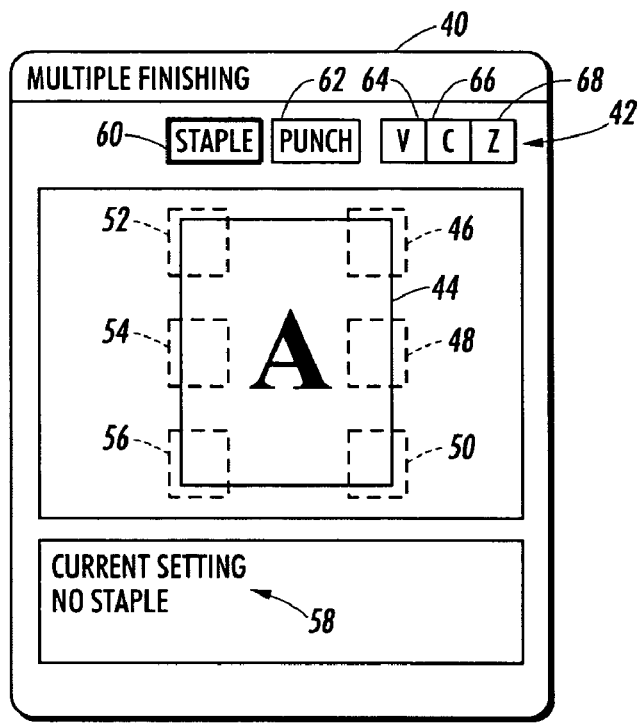
FIG. 2 is an exemplary embodiment of a finishing option window.

With reference now to FIG. 2, a finishing option window 40 is shown on the user interface 19 in accordance with concepts of the present application. The exemplary finishing window 40 includes a tool mode selection area 42, a document mimic 44 and finishing parameter location area identifiers 46-56. Also shown, but not necessary for embodiments of the present application, is a text summary 58 for providing a textual description of current finishing parameter settings. The tool mode selection area 42 includes text and/or icons representing various finishing options appropriate for the particular finishing system 28. For example, in the figure, a staple tool 60 is shown outlined in bold indicating that the staple tool is currently selected. Of course, the staple tool 60 could also be represented as an iconic view of a stapler. Other tool selections shown, include, without limitation, a punch tool 62, a V-fold tool 64, a C-fold tool 66, and a Z-fold tool 68. Alternately, tool selections can be made by other means such as, e.g., a drop-down menu selected by the user.

As shown in the figure, each of the aforementioned non-selected tools is shown with a light gray outline indicative of not being currently selected or interactive. In the embodiment described, only one tool mode may be active at a given time. The document mimic 44 is an abstract representation of the user's job, and reflects any finishing parameters set from any current tool mode selections as described in further detail below. Finally, as shown in the figure, a pointer 70 is provided for selecting various of the finishing options 42 and/or finishing location identifiers 46-56. The pointer 70 is shown as a standard arrow pointer indicating that the pointer 70 does not presently overlap any of the tool mode selections or location identifiers 46-56. It is to be understood that the pointer 70 may be controlled in various embodiments by any of a number of means known in the art, including the pointing device 21 and/or a touch-screen display device 20. Although preferred embodiments include finishing parameter location area identifiers 46-56 in the finishing option window, alternate embodiments may operate without visible location area identifiers, or may display particular location area identifiers when the pointer 70 is in the vicinity of an operable and available location for the corresponding selected tool.

Figure 3:
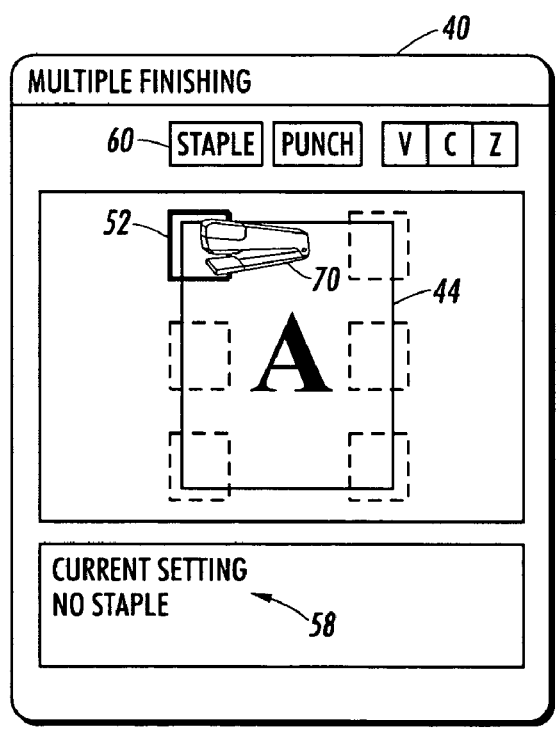
FIG. 3 shows a finishing option window during selection of a stapling option.

With reference now to FIG. 3, methods of the present application are illustrated with respect to the staple tool 60. As shown, the user has placed the pointer 70 over the location indicator 52 and the pointer 70 has taken on the graphical appearance of a hand-operated stapler. Additionally, the location identifier 52 has been embellished, in this case by means of a bold dark border, to indicate that the system is prepared for the user to select a stapling option in the top left corner of the document mimic 44, that is, the location identifier 52 is now active. The text summary area 58 correctly shows that no staple option has yet been selected.

Figure 4:
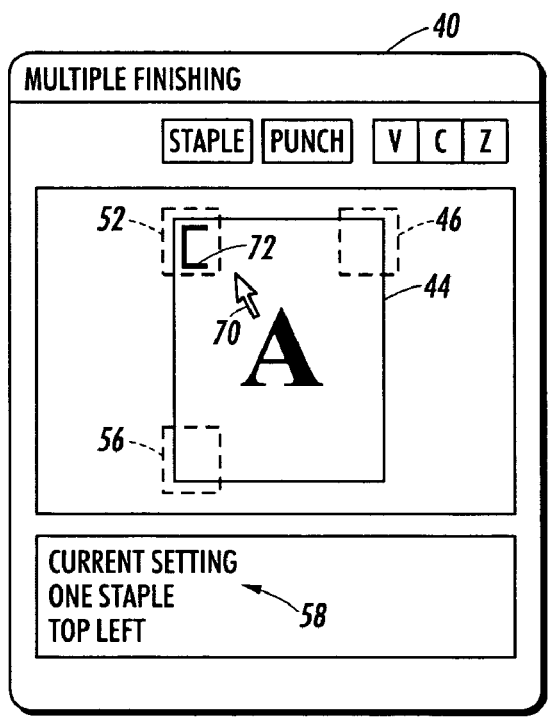
FIG. 4 shows a finishing option window after selection of a stapling option.

With reference now to FIG. 4, and continuing reference to FIG. 3, the user has activated the indicated stapling option by, e.g., clicking a button on a mouse (not shown) which controls the position of pointer 70. Of course, on systems including a touch-screen user interface, the user may activate options by making an appropriate selection on the display screen of the user interface. The user has further moved the pointer 70 away from the location identifier 52, and the location identifier 52 is now embellished further by showing a graphical representation of a first staple 72 overlaid on the document mimic 44. The text summary area 58 has been updated to indicate that the user has selected one staple at the top left corner of the document mimic 44. It should be further noted that only location identifiers 46 and 56 remain in conjunction with the embellished location identifier 52. The remaining location identifiers 48-50 and 54 have been removed from the display because stapling in these locations would be contradictory to the staple indicated in location identifier 52. In this way, the user is relieved of any manual necessity to keep track of which options conflict with the user's initial selection of a stapling location identifier 52.

Alternately, rather than removing the location identifiers from the display, any location identifiers which are to be disabled can be made unavailable by other means such as, e.g., graying out the appropriate location identifiers and making them non-selectable or otherwise altering the appearance of the location identifiers. Further, particularly with reference to the stapling tool, but not limited to the stapling tool, the graphical representations of the effects of respective tools are preferably shown in a direction or alignment which corresponds to the direction in which the particular machine will orient the respective tool operation. For example, the orientation of the graphical representation of each staple preferably corresponds to the orientation of the physical staple in the finished output document.

Figure 5:
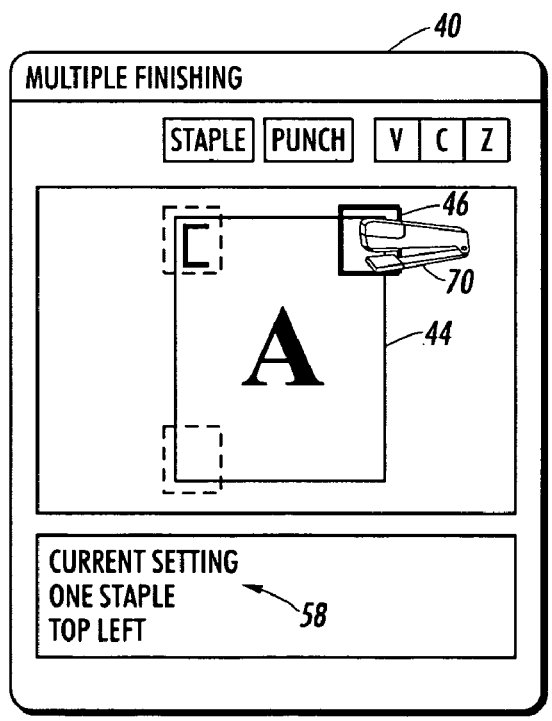
FIG. 5 shows a finishing option window during selection of a second stapling option.
Figure 6:
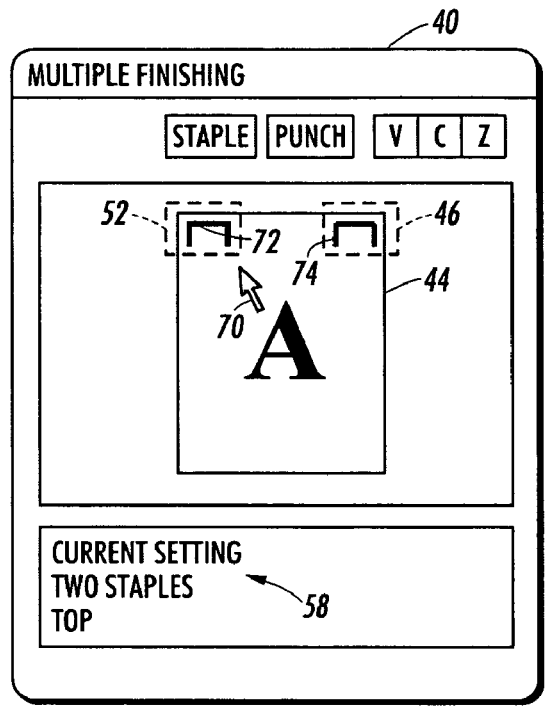
FIG. 6 shows a finishing option window after selection of a second stapling option.

Continuing with FIG. 5, the user has placed the pointer 70 over the location identifier 46 in anticipation of selecting a staple option in the top right corner of the document mimic 44. With reference now to FIG. 6, the user has activated the staple option for location identifier 46 and, therefore, a second staple 74 is shown in that location. It can be further seen in the figure that each of the first staple 72 and the second staple 74 have been rotated 90° because the system is now aware that a top stapling operation has been requested and the text summary 58 has been further updated to indicate that two staples have been selected at the top of the document. The rotation of the first and second staples 72, 74, provides additional positive feedback to the user, showing graphically, in a WYSIWYG format, how the final output document is currently programmed to be finished.

Figure 7:
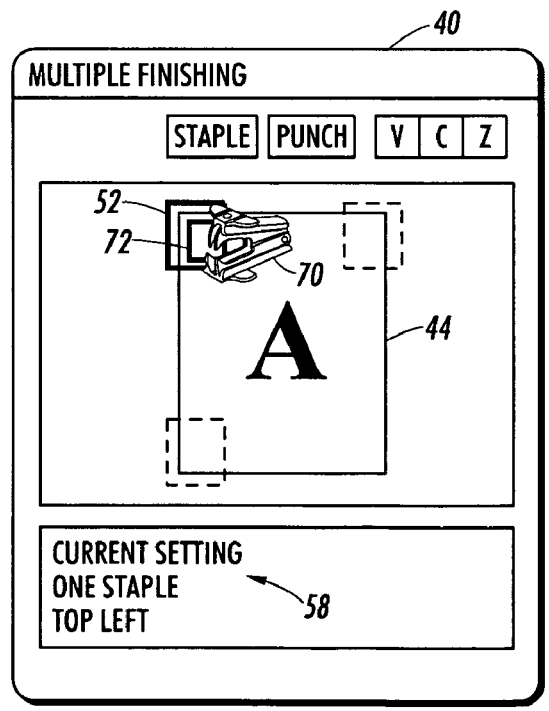
FIG. 7 shows a finishing option window during selection of undoing a stapling option selection.

With reference now to FIG. 7, a method of undoing a previous selection is shown. In the figure, it is assumed that the user has previously selected one staple in the top left corner of the document mimic 44 as previously shown in FIG. 4, and the user has now moved the pointer 70 over the location identifier 52 encompassing the previously selected first staple 72. Because a staple has already been previously selected for the indicated location, the pointer 70, rather than mimicking a hand stapler, now represents a hand operated staple remover. This provides graphical confirmation to the user that selecting this option, by means of a click of the mouse button for example, will undo the previous staple selection. In this manner, the user is provided with a convenient and easy method of undoing previously selected options because of the flip-flop nature of the options.

Figure 8:
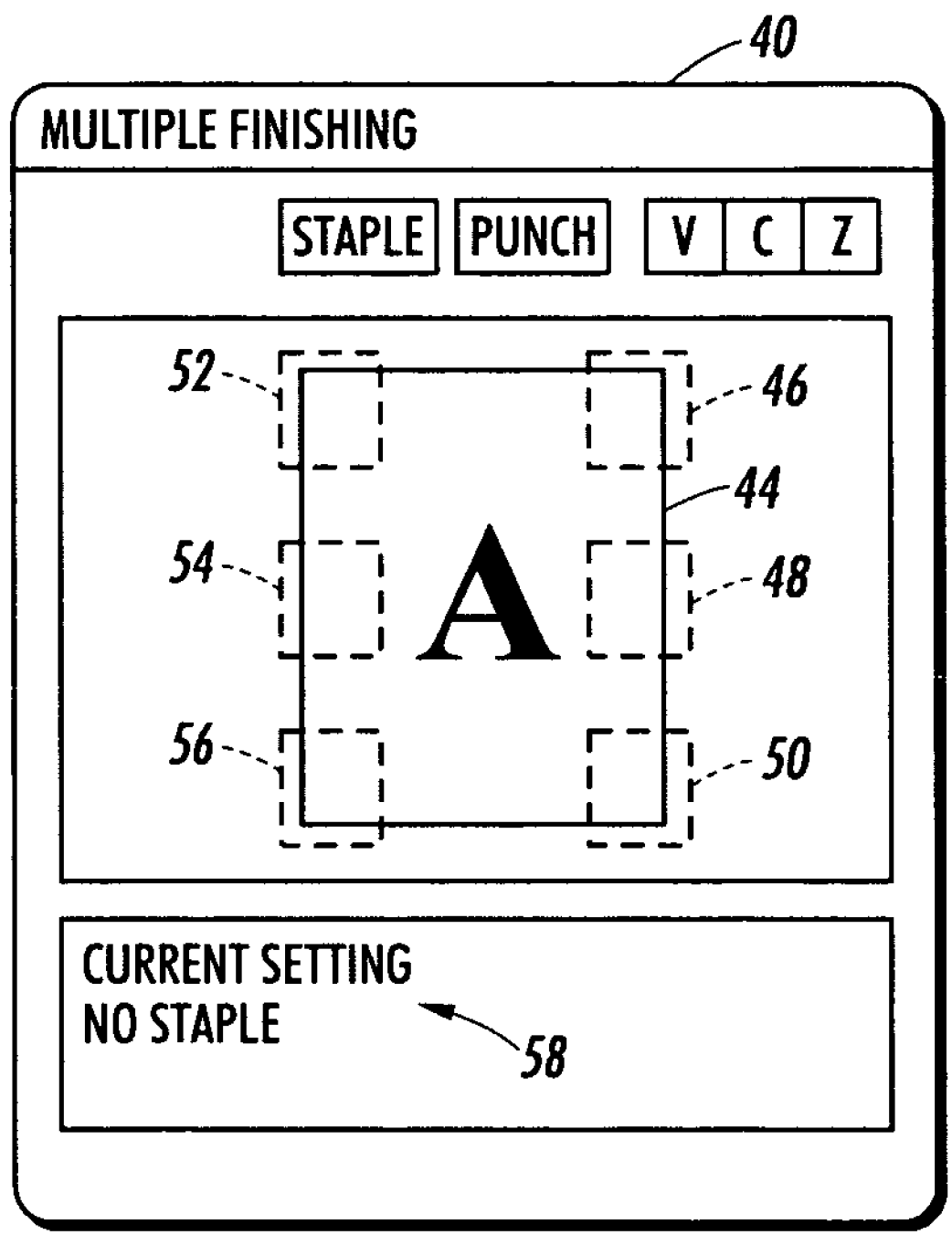
FIG. 8 shows a finishing option window after undoing all selected finishing options.

As shown now with reference to FIG. 8, the user has selected the unstaple operation and, therefore, the document mimic 44 has returned to its original state, and each of the location identifiers 46-56 is once again shown in the finishing window 40. The text summary area 58 has also reverted to its original setting showing no staples in the document.

While operation of the staple tool of one embodiment of the present application is described above, with reference to FIGS. 2-8, it is to be appreciated that operation of other tools such as, e.g., the punch tool 62, operate in a similar fashion and are, therefore, not described in detail herein. Further, it is to be appreciated that appropriate graphical representations of the document mimic 44 or representations within the document mimic 44 are shown for each of the available tool modes provided in the tool mode area 42. For example, if one of the folding tool modes 64-68 is selected and active, the document mimic 44 may be morphed somewhat to represent a document in the process of being folded, or partially folded, in accordance with the folding option selected. Alternately, the pointer 70 may take on the representation of an appropriately folded document, with light gray or dashed lines presented in the document mimic at the corresponding fold locations. As another example, in the case of undoing a previously selected hole punching operation, the pointer may take on the appearance of a patch for performing a hole-patching operation.

In a preferred embodiment, regardless of which tool mode is selected, all presently selected tool modes can be shown in the document mimic 44. For example, the document mimic 44 may show that the location identifiers on the left side of the document mimic include punched holes, even though the staple tool may be currently selected. In other words, one feature of the present application is a progressive disclosure and interactive behavior of the document mimic 44 so that the user, at any time, sees a WYSIWYG graphical representation of the final output document to be prepared by the finishing system 28.

Figure 9:
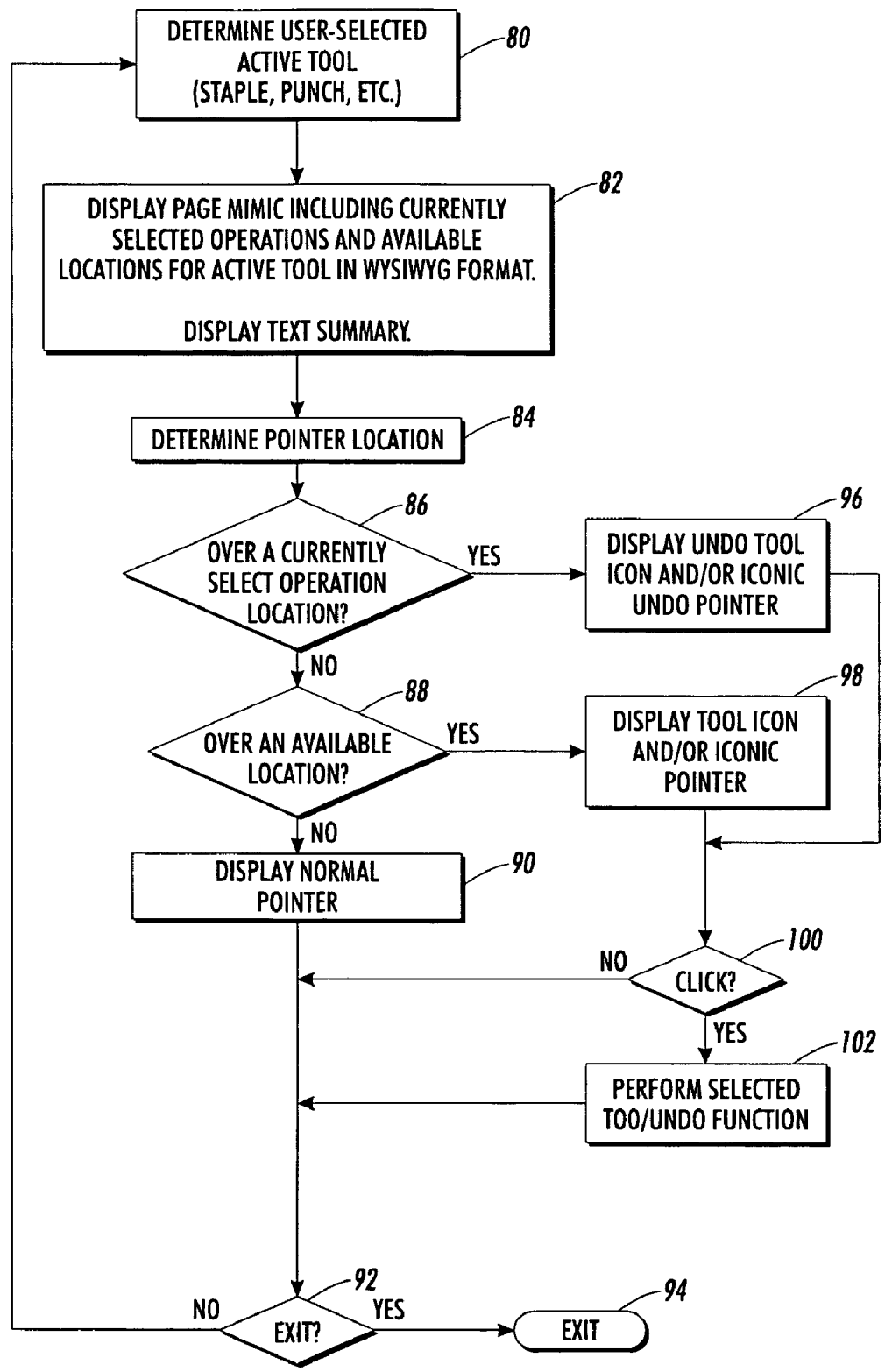
FIG. 9 is a flowchart showing an exemplary method for implementing tool selections.

With reference now to FIG. 9, a flowchart is provided showing one method for implementing each of the tool functions 42. It is to be appreciated that the flowchart shown in FIG. 9 is generic with respect to the tools 60-68 shown in the tool modes 42. Because each tool mode operates in essentially the same fashion as the remaining tool modes, each tool mode can function in a manner similar to that shown in the figure. It is to be further understood that the arrangement of decision steps and function steps as shown in the figure is arbitrary and presented here only for a further understanding of the present application. Alternate arrangements of the decision steps and function steps are included within the scope of the present application.

In a first step 80, it is determined which tool mode has currently been selected by the user such as, e.g., the staple tool mode, the punch tool mode, or other tool mode. In step 82, the page mimic 44 is displayed including all currently selected tool functions such as, e.g., staples and punched holes, if any, and available locations for the currently selected tool mode, if any. The text summary 58 is also displayed showing the current status of each of the tool modes 42. In a step 84, the location of the pointer 70 is determined and at step 86, it is determined whether or not the pointer is currently within one of the location identifier areas 46-56 where a tool operation has previously been selected. If not, at step 88, it is then determined if the pointer is over a location identifier that is available for selection of a tool function. If not, at step 90, a normal pointer is displayed indicating that no action can be taken at the present location.

At this time, if either the user or system has indicated that the function should terminate, the routine is exited at step 94. Otherwise, processing returns to the first step 80 in order to update the display status based on any user input. It is to be understood that while the method shown in FIG. 9 is being described in terms of the decisions being made in a sequential, hierarchical fashion, this is only for purposes of explaining the present application. In many embodiments, for example, many of the functions shown in the flow chart will be activated based on events detected by the operating system, such as a mouse click for example, as is well known in the art.

Returning to step 86, if it is determined that the pointer is over a location identifier where a previous operation has been selected, therefore, at step 96, the pointer is displayed as an appropriate undue type of graphic such as, e.g., a hand operated stapler remover. If, however, at step 88 it was determined that the pointer is over an available location identifier, at step 98, the pointer is displayed as a graphical representation of the appropriate tool, such as, e.g., a hand operated stapler. In either of the above two cases, processing continues at step 100 where it is determined if the user has selected an action by clicking, e.g., a button on a mouse pointer and, if so, at step

102, the indicated function is performed and appropriate status indicators in the storage system 22 are updated to indicate the current state which should be shown in the document mimic 44.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. In a printing system having a user interface with a graphical display screen, and having a finishing subsystem for applying user-specified finishing options to an output document, a method of programming the finishing options, the method comprising:

displaying a finishing window on the user interface display screen;

displaying a document mimic in the finishing window in the WYSIWYG format where the document mimic comprises only one page of the document at a time where the one page occupies at least one quarter of the entire screen area;

displaying a user-controlled pointer on the user interface display screen;

accepting a user selection of a finishing tool;

displaying at least one finishing location identifier overlaid on at least one page of the document, each displayed location identifier associated with the currently activated finishing tool, each finishing location identifier corresponding to a location of the output document for which the user can select activation of the selected finishing tool or for which the user can undo a previously selected activation of the selected finishing tool, each finishing location identifier displayed overlaid on only one page of the document mimic, and each displayed location identifier identifying a corresponding region of the output document by its location on the document mimic;

displaying at least one finishing tool selection region in the finishing window for enabling the user to activate the finishing tool selected from at least one available finishing tool;

highlighting a displayed finishing location identifier when the pointer overlaps the respective the displayed finishing location identifiers;

changing the appearance of the pointer to a graphical likeness tool which performs a function of the activated finishing tool when the pointer overlaps an available finishing location;

accepting a user selection of a finishing location by selection of one of the displayed finishing location identifiers;

performing a graphical representation of an operation of the activated finishing tool in the portion of the document mimic identified by the selected finishing location;

storing the user selection of the finishing tool and the finishing location;

and producing the output document, the producing including: performing a finishing tool function associated with the selected finishing tool on the output document at the selected finishing location.

2. In a printing system having a user interface with a graphical display screen, and having a finishing subsystem for applying user-specified finishing options to an output document, a method of programming the finishing options, the method comprising:

displaying a finishing window on the user interface display screen;

displaying a document mimic in the WYSIWYG format, resembling a full-scale, realistic, representation of the document occupying at least one fourth of the screen area in the finishing window;

displaying a user-controlled pointer on the user interface display screen; accepting a user selection of a finishing tool;

displaying at least one finishing location identifier overlaid on at least a portion of the document mimic, each displayed location identifier associated with the currently activated finishing tool, each finishing location identifier corresponding to a location of the output document for which the user can select activation of the selected finishing tool or for which the user can undo a previously selected activation of the selected finishing tool, each finishing location identifier displayed overlaid on at least a portion of the document mimic, and each displayed location identifier identifying a corresponding region of the output document by its location on the document mimic;

displaying at least one finishing tool selection region in the finishing window for enabling the user to activate the finishing tool selected from at least one available finishing tool;

highlighting a displayed finishing location identifier when the pointer overlaps the respective the displayed finishing location identifiers;

changing the appearance of the pointer to a graphical likeness tool which undoes a function of the activated finishing tool when the pointer overlaps the selected finishing locations, and when a graphical representation of the operation of the activated finishing tool is present in the selected finishing location of the document mimic;

accepting a user selection of a finishing location by selection of one of the displayed finishing location identifiers;

performing a graphical representation of an operation of the activated finishing tool in the portion of the document mimic identified by the selected finishing location;

storing the user selection of the finishing tool and the finishing location;

and producing the output document, the producing including: performing a finishing tool function associated with the selected finishing tool on the output document at the selected finishing location.

3. The method of claim 2, wherein the displaying at least one finishing tool selection region comprises at least one of:

displaying a button;

displaying a text box; and displaying an iconic representation of the at least one finishing tool.

4. The method of claim 2, the method further including:

preventing user selection of a displayed finishing location identifier if operation of the activated finishing tool conflicts with operation of the finishing tool associated with a previously selected finishing location identifier.

5. The method of claim 4, wherein the preventing user selection of a displayed finishing location identifier includes at least one of:

removing the displayed finishing location identifier from the finishing window;

altering the appearance of the displayed finishing location identifier to indicate deactivation of the respective finishing location identifier; and making the displayed finishing location identifier non-selectable.

6. In a reprographic system having a user interface with a graphical display screen, and having a finishing system for applying user-specified finishing options to a printed output document, a method of programming the finishing options, the method comprising:

displaying a finishing window on the user interface display screen;

displaying a page mimic in the finishing window in the WYSIWYG format, the page mimic forming an realistic representation of a document page;

displaying a plurality of finishing tool selection regions in the finishing window for enabling the user to activate one of the plurality of finishing tools, the displaying the plurality of finishing tool selection regions including at least one of:

displaying a button corresponding to one of the plurality of finishing tools;

displaying a text box corresponding to one of the plurality of finishing tools; and displaying an iconic representation of a respective one of the plurality of finishing tools.

displaying at least one finishing location identifier overlaid on at least a portion of the page mimic, each displayed location identifier associated with the currently activated finishing tool, and each displayed location identifier identifying a region of the printed output document by its location on the page mimic;

accepting a user selection of a displayed finishing location identifier;

performing a WYSIWYG representation of an operation of the activated finishing tool in the portion of the page mimic identified by the selected finishing location identifier, the performing a WYSIWYG representation of the operation including at least one of:

performing a WYSIWYG stapling operation to the page mimic wherein the staple function is indicated by an icon comprised of an illustration of a stapler;

performing a WYSIWYG hole-punching operation to the page mimic;

performing a WYSIWYG V-folding operation to the page mimic;

performing a WYSIWYG C-folding operation to the page mimic;

performing a WYSIWYG Z-folding operation to the page mimic; and performing a WYSIWYG binding operation to the page mimic;

performing a WYSIWYG representation of undoing the operation of the activated finishing tool in the portion of the page mimic identified by the selected finishing location identifier when a WYSIWYG representation of the operation of the activated finishing tool is present in the portion of the page mimic identified by the selected finishing location identifier, the performing the WYSIWYG representation of undoing the operation including at least one of:

performing a WYSIWYG staple removing operation to the page mimic wherein the staple function is indicated by an icon comprised of an illustration of a staple remover;

performing a WYSIWYG punched hole patching operation to the page mimic; and performing a WYSIWYG unfolding operation to the page mimic;

performing a WYSIWYG unbinding operation to the page mimic;

making unavailable a displayed finishing location identifier if operation of the activated finishing tool at the respective location conflicts with operation of the finishing tool associated with a previously selected finishing location identifier;

storing the user selection of the displayed finishing location identifier; and producing the printed output document, the producing including: performing a finishing tool function associated with the selected finishing location identifier on the printed output document.

7. The method of claim 6, the method further including:
displaying a text summary on the user interface display screen indicating a current status of all performed WYSIWYG representations of operations of activated finishing tools on which a respective WYSIWYG representation of undoing the operation of the activated finishing tool has not been performed.

8. The method of claim 6, the method further including:
displaying a user-controlled pointer on the user interface display screen; and
highlighting one of the displayed finishing location identifiers when the pointer overlaps the respective one of the displayed finishing location identifiers.

9. The method of claim 8, the method further including:
changing the appearance of the pointer to a WYSIWYG likeness tool which performs a function of the activated finishing tool when the pointer overlaps one of the displayed finishing location identifiers;
and changing the appearance of the pointer to a WYSIWYG likeness tool which undoes a function of the activated finishing tool when the pointer overlaps one of the displayed finishing location identifiers, and when a WYSIWYG representation of the operation of the activated finishing tool is present in the portion of the page mimic identified by the selected finishing location identifier.

10. A printing system, the printing system comprising:
a user interface including a graphical display screen; a user input/output device; and a pointing device;
a processor for receiving and processing digital documents from at least one of a scanning system, a network, a local disk storage unit and a remote disk storage unit; receiving user instructions from the user interface; and displaying instructions and graphical images on the display screen;
a storage system operatively connected to the processor; and
a finishing system for receiving digital documents and finishing options from the processor and for producing finished documents;
wherein the processor is configured to:
display a finishing window on the user interface display screen;
display a page mimic in the finishing window in the WYSIWYG format, the page mimic forming an abstract representation of a document page;
accept a user selection of a finishing tool;
displaying at least one finishing location identifier, each finishing location identifier corresponding to a location of the finished document for which the user can select activation of the selected finishing tool or for which the user can undo a previously selected activation of the selected finishing tool, each finishing location identifier displayed overlaid on at least a portion of the page mimic, and each displayed location identifier identifying a corresponding region of the finished document by its location on the page mimic;

accepting a user selection of a finishing location by selection of one of the displayed finishing location identifiers;

perform a WYSIWYG representation of an operation of the activated finishing tool in the portion of the page mimic identified by the selected finishing location, the performing a WYSIWYG representation of the operation including at least one of:

performing a WYSIWYG stapling operation to the page mimic wherein the stapling function is indicated by an icon comprised of an illustration of a stapler;

performing a WYSIWYG hole-punching operation to the page mimic;

performing a WYSIWYG V-folding operation to the page mimic;

performing a WYSIWYG C-folding operation to the page mimic;

performing a WYSIWYG Z-folding operation to the page mimic; and performing a WYSIWYG binding operation to the page mimic;

perform a WYSIWYG representation of undoing the operation of the activated finishing tool in the portion of the page mimic identified by the selected finishing location when a WYSIWYG representation of the operation of the activated finishing tool is present in the portion of the page mimic identified by the selected finishing location, the performing the WYSIWYG representation of undoing the operation including at least one of:

performing a WYSIWYG staple removing operation to the page mimic wherein the staple removing function is indicated by an icon comprised of an illustration of a staple remover;

performing a WYSIWYG punched hole patching operation to the page mimic;

performing a WYSIWYG unfolding operation to the page mimic; and performing a WYSIWYG unbinding operation to the page mimic;

make unavailable a finishing location if operation of the activated finishing tool at the respective location conflicts with operation of the finishing tool associated with a previously selected finishing location;

store a finishing option status of each of the plurality of finishing tools in the storage system based on the performed representations of an operation and the performed representations of undoing an operation; and send the stored digital document and the stored status to the finishing system; and wherein the finishing system is configured to:

perform each finishing tool feature based on the finishing option status received from the processor.

11. The printing system of claim 10, the processor further configured to:

display a text summary on the user interface display screen indicating a current status of all performed WYSIWYG representations of operations of activated finishing tools on which a respective WYSIWYG representation of undoing the operation of the activated finishing tool has not been performed;

display a user-controlled pointer on the user interface display screen; and highlight one of the displayed finishing location identifiers when the pointer overlaps the respective one of the displayed finishing location identifiers; and wherein the processor is configured to accept a user selection and activation of a finishing tool and a finishing location by performing the steps of:

displaying at least one finishing tool selection region in the finishing window for enabling the user to activate the finishing tool selected from at least one available finishing tool;

displaying at least one finishing location identifier overlaid on at least a portion of the page mimic, each displayed location identifier associated with the currently activated finishing tool, and each displayed location identifier identifying a region of the output document by its location on the document mimic.

12. The printing system of claim 10, wherein the printing system is a xerographic system.

* * * * *